Aug. 30, 1932.    M. A. YOUTZ    1,875,309
MANUFACTURE OF CHLORHYDRINS
Filed Nov. 9, 1929
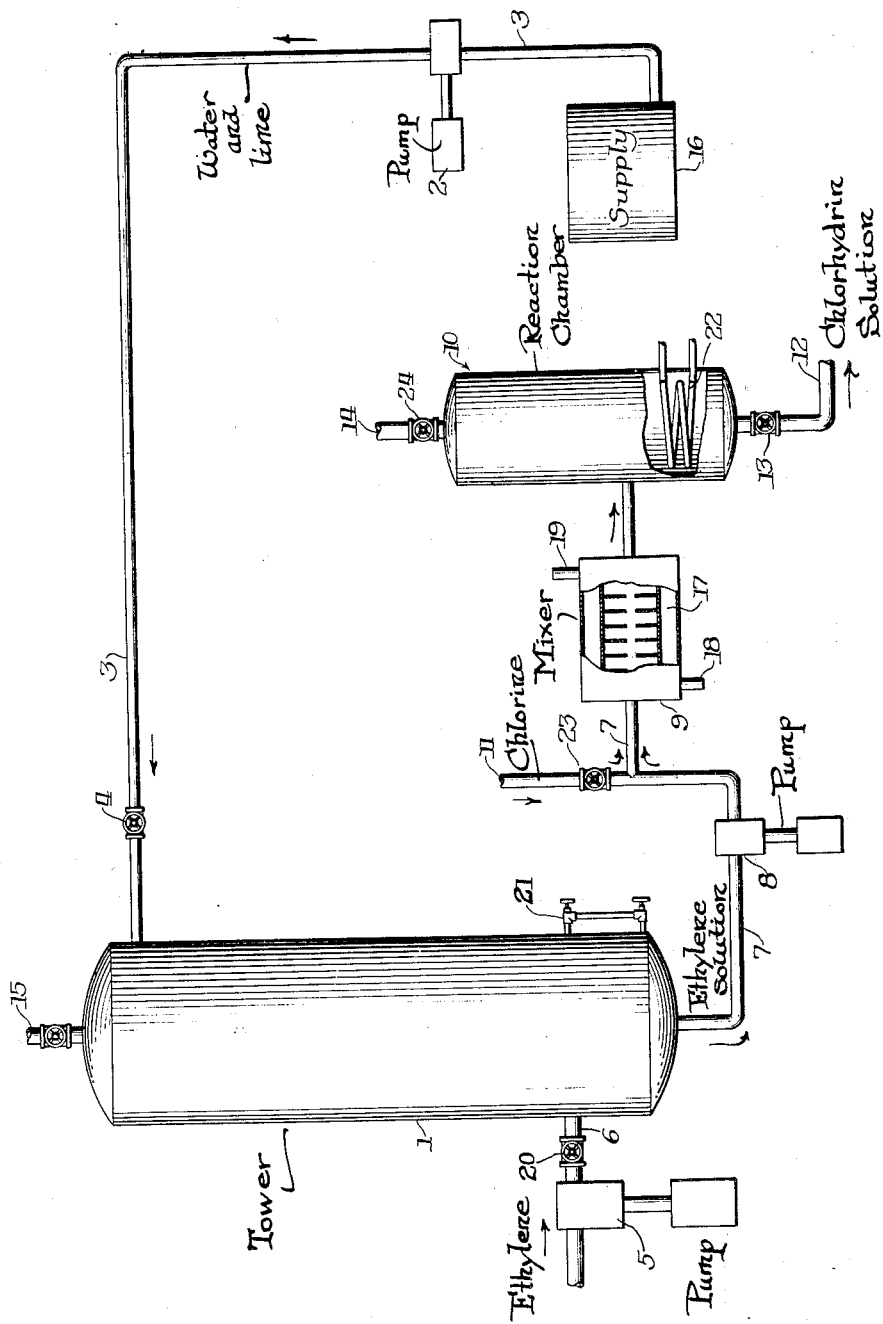
Inventor:
Merrill A. Youtz
By Bruce K. Brown. Atty.

Patented Aug. 30, 1932

1,875,309

UNITED STATES PATENT OFFICE

MERRILL A. YOUTZ OF HAMMOND, INDIANA, ASSIGNOR TO STANDARD OIL COMPANY, OF CHICAGO, ILLINOIS, A CORPORATION OF INDIANA

MANUFACTURE OF CHLORHYDRINS

Application filed November 9, 1929. Serial No. 405,916.

This invention relates to processes of preparing olefine chlorhydrins and particularly ethylene chlorhydrin and it comprises a process wherein an olefine, for example, ethylene, while in aqueous solution and under high pressure, is caused to react with hypochlorous acid; it further comprises a process wherein gaseous ethylene is pumped, under high pressure, into a hypochlorite solution or an aqueous suspension of hydrated lime until the latter is substantially saturated with ethylene, chlorine thereafter being introduced into the solution whereby hypochlorous acid is formed and reacts with the ethylene; and it further comprises a process wherein ethylene, under high pressure, is dissolved in water, the aqueous solution, still under high pressure, transferred to a reaction vessel containing lime, and the resulting mixture chlorinated.

Ethylene chlorhydrin is customarily made by reacting gaseous ethylene with hypochlorous acid in aqueous solution. This is usually done by bubbling ethylene gas through a very dilute solution of hypochlorous acid. A preferable way is to pass the ethylene into a solution of a hypochlorite together with an acid capable of liberating free hypochlorous acid from the hypochlorite. Sodium hypochlorite and carbon dioxide gas are often used for this purpose. There are certain disadvantages inherent in such processes. Chief among them is the slowness of the reaction, together with its attendant difficulties. Ethylene gas is but slightly soluble in water. In round numbers, at 20° C. the solubility is about 12.5 cubic centimeters in 100 cubic centimeters of water. In parts by weight, this amounts to about 0.14 grams per liter.

When ethylene is brought into contact with a hypochlorous acid solution, the tendency is, of course, to form ethylene chlorhydrin. It is necessary, however, that the ethylene first dissolve in the hypochlorous acid solution before reaction can occur. Because of the slight solubility of ethylene in water, ethylene dichloride is also formed to a considerable extent from undissolved ethylene and chlorine. To prevent dichloride formation, under atmospheric pressure conditions, it is desirable to maintain an excess of ethylene during its reaction with hypochlorous acid. In order to realize this, it has been deemed essential that large volumes of ethylene gas be passed into very dilute solutions of hypochlorous acid, and the excess ethylene leaving the solution unacted upon, recycled. Such a process involves handling large quantities of gases with but small quantities of ethlyene chlorhydrin being formed in any one cycle. In order to overcome in part the obvious disadvantages inherent in any process wherein reaction is dependent upon good contact between gas and liquid, various complicated, although efficient, stirring devices have been suggested.

Irrespective of how the hypochlorous acid itself is formed, it may in general be said that processes advocated at present are characterized by passing ethylene gas under a slight pressure through an extremely dilute solution of hypochlorous acid either as such or formed in situ, and the art has been obliged to content itself with the formation of quantities of undesirable ethylene dichloride, the recycling of large volumes of gas, and the provision of complicated agitating devices.

I have now found that ethylene possesses the unique and useful property of being markedly soluble in water at ordinary temperatures, (15° C. to 20° C.) provided the pressure on the solution is raised to upwards of 100 to 200 atmospheres, roughly 1500 to 3000 pounds per square inch. I find that under a pressure of 200 atmospheres, and at a temperature of 20° C. the solubility of ethylene in water amounts to about one gram molecular weight per liter. In round numbers, this is 28 grams in 1000 cubic centimeters of solution. This is 200 times the solubility of ethylene at atmospheric pressure since, as previously stated, ethylene is normally soluble to the extent of about 0.14 grams per liter.

In the present process, I make use of this fact by so conducting the formation of chlorhydrin that at all times the ethylene in aqueous medium is under a pressure far in excess of any hitherto proposed. As a result, I am enabled to prepare chlorhydrin solutions containing from 4 to 8 per cent ethylene chlorhydrin or more, substantially without the formation of any dichlorides, without the necessity for recycling; and without requiring complicated stirring or agitating devices. I find it only necessary to bring the ethylene gas, dissolved in water, under high pressure, into contact with hypochlorous acid. The process, may be rendered continuous by pumping chlorine, hypochlorous acid solution, or solutions capable of yielding hypochlorous acid under high pressure, into a tower containing an aqueous solution of ethylene also under high pressure which is replenished from time to time. The solution of chlorhydrin formed within the tower can be withdrawn from the bottom thereof through a simple valve arrangement.

Alternatively, the ethylene under high pressure, can be pumped into the lower end of a tower, water under pressure, being introduced at the upper end until a saturated solution of ethylene in the water, and under high pressure, is obtained. The saturated solution can then be transferred to a reaction vessel wherein the ethylene is caused to unite with hypochlorous acid. On the accompanying sheet of drawing, I have indicated schematically in the single figure, a form of apparatus suitable for carrying out this and other exemplifications of my process.

In the drawing, 1 indicates a plate tower constructed to withstand pressures up to 200 atmospheres or more and interiorly provided with plates as is usual in gas and liquid contact apparatus of this type. A pump 2 serves to introduce water or aqueous liquids into the upper part of the tower from supply tank 16 through pipe 3 controlled by valve 4. At the lower end of the tower, compressor 5 is provided to pump ethylene under high pressure through pipe 6 and valve 20 into the bottom of the tower. A vent 15 is provided for the release of any undissolved gases which may accumulate in the tower.

The aqueous solution of ethylene under pressure is drawn off at the bottom of the absorption tower through line 7 and is forced by pump 8 through mixer 9 into reaction chamber 10. Chlorine under high pressure is introduced at 11 through valve 23 and mixed with the ethylene solution in mixer 9. Chlorhydrin solution is drawn from the reaction chamber by line 12 controlled by valve 13. Vent 14 is provided for the release of any insoluble gases which may be produced in the reaction chamber.

In using this apparatus, and in another exemplification of my process, I first charge the tower 1 with gaseous ethylene under a pressure of 200 atmospheres, assuming the temperature to be 20° C. and then introduce a suspension of hydrated lime by means of pump 2 until a quantity of solution collects in the lower part of the tower, compressed ethylene being supplied at such a rate as to maintain the desired pressure. I now transfer the solution of ethylene by means of pump 8 to mixer 9 at such a rate that the level in the tower 1 is held practically constant, as indicated by gage 21. Under these conditions of temperature and pressure, the solution should contain about one mole (28 grams) of ethylene per liter. I now introduce chlorine at 11 at a rate of one mole (70.9 grams) per liter of solution going to the mixer. I control the amount of lime in the suspension charged to tower 1 to produce a lime suspension of approximately one half the molal concentration of the ethylene in the solution leaving the tower, in this case one half mole or 28 grams of CaO per liter. The chlorine reacts first with the lime to form calcium hypochlorite in the mixer and reaction chamber 10, but this compound is decomposed at once to form hypochlorous acid and calcium chloride according to the following equations:

$$CaO + Cl_2 = CaCl(OCl)$$

$$CaCl(OCl) + Cl_2 + H_2O = CaCl_2 + 2HOCl$$

The hypochlorous acid at once reacts with the ethylene, forming ethylene chlorhydrin, according to the equation:

$$HOCl + C_2H_4 = CH_2OH - CH_2Cl$$

Under the foregoing conditions, the resulting solution will contain 80 grams of chlorhydrin per liter, that is, it is an 8 per cent solution of chlorhydrin, something that has not hitherto been realized in a single chlorinating operation, without re-cycling.

The ethylene chlorhydrin solution, also containing calcium chloride dissolved therein, is withdrawn from the reaction chamber by means of outlet pipe 12. The chlorhydrin can be recovered in a substantially anhydrous state by distillation and salting out, in ways well known. As a matter of fact, since dilute ethylene chlorhydrin solutions are useful in the preparation of glycols, I may advantageously treat the dilute solution with suitable alkaline re-agents to convert the chlorhydrin to glycol. Alternatively, I can treat the dilute solution with suitable re-agents under different conditions and convert the chlorhydrin into ethylene oxide which can easily be recovered by a simple distillation and condensing operation.

If I wish to obtain a chlorhydrin solution containing more than 8 per cent chlorhydrin I can re-saturate the 8 per cent solution with further quantities of ethylene gas under pressure, introduce chlorine in the presence of lime suspension, and thus form additional quantities of chlorhydrin, the amounts of water being so regulated that the ultimate chlorhydrin solution is stronger than 8 per cent. Or I can modify the temperature and pressure conditions of the foregoing example so that the pressure is increased and the temperature decreased, in this way securing greater solubility of the ethylene in water.

Instead of using a lime suspension in the absorption tower, I can introduce a slightly alkaline hypochlorite solution such as calcium hypochlorite. In this case I introduce an acid substance at 11 which will liberate the hypochlorous acid from the hypochlorite. Carbonic acid gas or a dilute aqueous solution of one of the stronger acids such as sulfuric acid is useful for this purpose. Or I can introduce chlorine which reacts with the hypochlorite solution to give hypochlorous acid according to the following equation:

$$CaClOCl + Cl_2 + H_2O = CaCl_2 + 2HOCl$$

It may be found necessary, with large size apparatus, and high concentrations of reagents, to provide the reaction chamber with a cooling coil 22 to lessen any heating effect. The mixer 9 is advantageously cooled by means of a water jacket 17 and water connections 18 and 19 as shown.

Of the various ways of preparing a solution of hypochlorous acid for reaction purposes, I find it most advantageous to use a suspension of hydrated lime which is subsequently chlorinated in the presence of the solution of ethylene and one of the important consequences is that under the high pressure conditions of my process I get no dichlorides or an insignificant quantity thereof, although I am using the highly reactive chlorine. This is explained by the fact that my reaction is conducted entirely in the liquid phase and is therefore subject to better control.

The temperature and pressure conditions are susceptible of considerable variation having regard for the nature of the process. For example, at 15° C. and under a pressure of 172 atmospheres, substantially the same quantity of ethylene (28 grams per liter) is soluble in water as at 20° C. and a pressure of 200 atmospheres. Ordinarily I prefer to operate at temperatures sufficiently high to prevent liquid ethylene separating from the solution as a separate phase because of the difficulty of obtaining homogeneous reaction in this case. In general it is best to work at the lowest possible temperature consistent with marked solubility of ethylene since, at low temperatures, the pressures need not be as great.

Although I have described my process as applied to making ethylene chlorhydrin, it should be understood that it is not necessarily limited to operations with ethylene but may also be advantageously used for preparing the chlorhydrins of the higher olefines such as propylene and butylene. Furthermore, these olefines may be employed in an impure condition, that is, they may be mixed with one another or with inert gases, providing of course that their concentration in such mixture is sufficient to give a satisfactory concentration in the aqueous solvent in which they are absorbed.

With the higher olefines such as propylene and butylene and mixtures of these gases with ethylene, I find it unnecessary to operate at pressures as high as those used with ethylene alone. This is due partly to the increased solubility of certain of these gases in water and partly to the tendency of the higher olefines to liquefy at the high pressures employed, causing some of the olefines to separate from the water solution in a separate liquid phase. This is not disadvantageous, however, since in my process, any liquefied olefine will tend to be dispersed through the aqueous solution and reaction will take place before stratification into two liquid layers can occur.

It is sometimes desirable to prepare chlorhydrins from olefines which are mixed with inert gases such as hydrogen, methane, etc. Such mixtures may contain as much as 50% of these inert gases. In my process I find that when I employ these mixtures, the major proportion of the olefines are selectively dissolved in the aqueous solution because of their greater solubility in water. By releasing the undissolved, inert gases from the top of the absorption tower as rapidly as they accumulate, I am able to operate successfully with these mixtures.

As previously stated, the major difficulty with the usual processes of making chlorhydrin, is due to the slight solubility of ethylene, thus tending toward appreciable yields of undesirable dichloride and requiring re-cycling in order that relatively strong chlorhydrin solutions can be obtained. It will be noted in the process of the present invention that the concentration of ethylene in any one chlorination cycle may be increased a hundredfold. This high concentration enormously facilitates the formation of chlorhydrin, practically reduces any dichloride formation to the vanishing-point and renders expensive agitating or stirring devices unnecessary.

Furthermore, in my process, I avoid reacting hypochlorous acid with ethylene in gaseous form. That is to say, my first step is the preparation of a solution of ethylene containing little or no undissolved gas. Reaction then takes place between dissolved ethylene and hypochlorous acid. There is practically no gaseous ethylene present. This is an additional reason for the substantial absence of dichlorides.

In the appended claims by the term "high pressure", I mean to distinguish from any prior process wherein the ethylene, at atmospheric pressure, or pressures relatively slightly above, has been reacted with hypochlorous acid. Such high pressures I construe to be above 40 atmospheres. While pressures somewhat below 40 atmospheres can be used, the full advantages of my process are only realized at pressures in excess of 40 atmospheres and more generally in the neighborhood of 100 to 200 atmospheres, since at these high pressures, chlorhydrin solutions having a concentration of 4 to 8 per cent, depending upon the quantity of ethylene dissolved, are readily obtainable in a single operation.

What I claim is:

1. The process of preparing ethylene chlorhydrin which comprises reacting ethylene with hypochlorous acid while maintaining the ethylene dissolved in an aqueous medium under a pressure of 100 to 200 atmospheres, the ethylene solution being substantially free of gaseous undissolved ethylene.

2. In the process of preparing ethylene chlorhydrin, the steps which comprise dissolving gaseous ethylene in water under a pressure of 100 to 200 atmospheres prior to reaction of the ethylene with hypochlorous acid, the ethylene solution being substantially free of gaseous, undissolved ethylene, and then subjecting the solution to the action of hypochlorous acid.

3. The process of preparing ethylene chlorhydrin which comprises passing ethylene under a pressure of 100 to 200 atmospheres into a suspension of hydrated lime, the solution of ethylene thus formed being substantially free of gaseous, undissolved ethylene, treating the resulting solution of ethylene in the hydrated lime suspension with chlorine under high pressure to form a calcium hypochlorite compound and continuing the addition of chlorine under high pressure to liberate free hypochlorous acid in situ.

4. The process of preparing ethylene chlorhydrin which comprises passing ethylene under a pressure of 100 to 200 atmospheres into an aqueous medium until sufficient ethylene is dissolved therein to yield a chlorhydrin solution containing more than about 2 per cent chlorhydrin, the solution of ethylene being substantially free of any gaseous, undissolved ethylene, and thereafter reacting the ethylene in said solution with hypochlorous acid.

5. The process of preparing ethylene chlorhydrin which comprises dissolving ethylene in water under a pressure of 100 to 200 atmospheres, to form a solution of ethylene substantially free of any gaseous, undissolved ethylene, thereafter mixing the solution with lime and treating the mixture with chlorine under high pressure, whereby hypochlorous acid is liberated in situ.

6. The process of preparing chlorhydrins from olefines which comprises dissolving the olefine in an aqueous medium under a pressure of at least 40 atmospheres to form a solution wherein substantially all of the olefine is dissolved and the solution is substantially free of any gaseous, undissolved olefine, and then reacting the solution with hypochlorous acid.

7. The process of preparing chlorhydrins from olefines which comprises passing the olefine under a pressure of at least 40 atmospheres into a suspension of hydrated lime to form a solution wherein substantially all of the olefine is dissolved and the solution is substantially free of any gaseous, undissolved olefine, and treating the resulting solution with chlorine under high pressure to develop free hyochlorous acid in situ.

8. The process of preparing chlorhydrins from olefines which comprises preparing an aqueous solution of the olefine under a pressure of at least 40 atmospheres, said solution comprising dissolved olefine and substantially no gaseous, undissolved olefine, so that all constituents thereof are in liquid phase, and then reacting the solution with hypochlorous acid.

MERRILL A. YOUTZ.